(12) United States Patent
Geders

(10) Patent No.: US 8,814,100 B2
(45) Date of Patent: Aug. 26, 2014

(54) CONTINUOUS MOLDLINE TECHNOLOGY (CMT) ELASTOMERIC CONTROL SURFACE

(75) Inventor: Paul F. Geders, Florissant, MO (US)

(73) Assignee: The Boeing Company, Chicago, IL (US)

(*) Notice: Subject to any disclaimer, the term of this patent is extended or adjusted under 35 U.S.C. 154(b) by 71 days.

(21) Appl. No.: 13/451,456

(22) Filed: Apr. 19, 2012

(65) Prior Publication Data

US 2013/0277503 A1   Oct. 24, 2013

(51) Int. Cl.
*B64C 9/16* (2006.01)

(52) U.S. Cl.
USPC .......................................... 244/215; 244/213

(58) Field of Classification Search
USPC .................................................. 244/213–217
See application file for complete search history.

(56) References Cited

U.S. PATENT DOCUMENTS

| | | | |
|---|---|---|---|
| 4,429,844 A * | 2/1984 | Brown et al. | 244/219 |
| 5,222,699 A | 6/1993 | Albach et al. | |
| 5,927,651 A | 7/1999 | Geders et al. | |
| 5,941,480 A | 8/1999 | Wille | |
| 5,947,417 A | 9/1999 | Cameron | |
| 5,947,422 A | 9/1999 | Wille | |
| 5,958,803 A | 9/1999 | Geiger | |
| 5,975,463 A | 11/1999 | Gruensfelder et al. | |
| 5,979,828 A | 11/1999 | Gruensfelder et al. | |
| 6,027,074 A | 2/2000 | Cameron et al. | |
| 6,048,581 A | 4/2000 | Waldrop, III | |
| 6,092,764 A | 7/2000 | Geders et al. | |
| 6,209,824 B1 | 4/2001 | Caton et al. | |
| 6,375,122 B1 | 4/2002 | Cameron et al. | |
| 6,467,733 B1 | 10/2002 | Young et al. | |
| 7,275,722 B2 * | 10/2007 | Irving et al. | 244/201 |
| 8,534,611 B1 * | 9/2013 | Pitt et al. | 244/214 |
| 2001/0006207 A1 * | 7/2001 | Caton et al. | 244/213 |

FOREIGN PATENT DOCUMENTS

| | | |
|---|---|---|
| DE | 19630681 A1 | 2/1998 |
| EP | 2397403 A2 | 12/2011 |
| WO | 9640553 A1 | 12/1996 |
| WO | 2010023475 A2 | 3/2010 |

OTHER PUBLICATIONS

Florence V. Hutcheson, Thomas F. Brooks†, William M. Humphreys, Jr., "Noise Reduction from a Continuous Mold-Line Link Flap Configuration", Aeroacoustics Branch, NASA Langley Research Center, Hampton, Virginia 23681-2199, 2008.
EP13163504.7 Extended European Search Report of European Patent Office, Aug. 7, 2013.

* cited by examiner

*Primary Examiner* — Timothy D Collins
*Assistant Examiner* — Nicholas McFall
(74) *Attorney, Agent, or Firm* — Ameh IP; Elahe Toosi; Lowell Campbell

(57) ABSTRACT

A continuous moldline technology elastomeric control surface and methods are presented. A control surface is coupled to a fluid-dynamic body. An elastomer interface is coupled to the control surface and the fluid-dynamic body such that a joint gap caused by movement of the control surface relative to the fluid-dynamic body is filled.

15 Claims, 7 Drawing Sheets

CONTINUOUS MOLDLINE TECHNOLOGY (CMT) ELASTOMERIC CONTROL SURFACE

FIELD

Embodiments of the present disclosure relate generally to continuous moldline technology. More particularly, embodiments of the present disclosure relate to continuous moldline technology control surfaces.

BACKGROUND

When flight control surfaces move they typically create gaps, which in turn cause additional airframe acoustic noise, reduced aerodynamics, and increased drag. For example, during approach to landing, gaps may be exposed during movement of flight control surfaces for pitch and roll to change direction of flight. Exposing any gaps or edges can increase acoustic noise and decrease aerodynamics efficiency and/or increase drag.

SUMMARY

A continuous moldline technology elastomeric control surface and methods are presented. A control surface is coupled to a fluid-dynamic body. An elastomer interface is coupled to the control surface and the fluid-dynamic body such that a joint gap caused by movement of the control surface relative to the fluid-dynamic body is filled.

In this manner, a movement of a vehicle is subtly/quietly controlled without exposing gaps, decreasing acoustics noise and achieving improved aerodynamics. Exposing no gaps or edges can decrease acoustic noise and increase aerodynamics efficiency or decrease drag. For example, during approach to landing, gaps are bridged, which reduces noise during movement of flight control surfaces for pitch and roll to change direction of flight. Furthermore, a flight control surface surrounded by an elastomer may be smaller than a flight control surface not surrounded by the elastomer, while preforming substantially equivalently to the flight control surface not surrounded by the elastomer.

In an embodiment, a continuous moldline technology elastomeric control surface comprises a control surface and an elastomer interface. The control surface is coupled to a fluid-dynamic body. The elastomer interface is coupled to the control surface and the fluid-dynamic body such that a joint gap caused by movement of the control surface relative to the fluid-dynamic body is filled.

In another embodiment, a method for providing a continuous moldline technology elastomeric control surface provides a control surface coupled to a fluid-dynamic body. The method further provides an elastomer interface coupled to the control surface and the fluid-dynamic body such that a joint gap caused by movement of the control surface relative to the fluid-dynamic body is filled.

In a further embodiment, a method for controlling lift of a fluid-dynamic body using a continuous moldline technology elastomeric control surface conforms to a contour of a control surface coupled to a fluid-dynamic body in a first control surface position. The method further alters a thickness of the fluid-dynamic body in a second control surface position. The method further conforms an elastomer interface coupled to the control surface and the fluid-dynamic body to a continuous moldline such that a joint gap caused by movement of the control surface relative to the fluid-dynamic body is filled.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to elastomers, control surfaces, continuous mold line technology and other functional aspects of the systems (and the individual operating components of the systems) may not be described in detail herein. In addition, those skilled in the art will appreciate that embodiments of the present disclosure may be practiced in conjunction with a variety of hardware and software, and that the embodiments described herein are merely example embodiments of the disclosure.

Embodiments of the disclosure are described herein in the context of a non-limiting application, namely, elastomeric control structure of an aircraft. Embodiments of the disclosure, however, are not limited to such aircraft elastomeric control structure, and the techniques described herein may also be utilized in other applications. For example but without limitation, embodiments may be applicable to manned and unmanned ground, air, water and underwater vehicles.

As would be apparent to one of ordinary skill in the art after reading this description, the following are examples and embodiments of the disclosure and are not limited to operating in accordance with these examples. Other embodiments may be utilized and structural changes may be made without departing from the scope of the exemplary embodiments of the present disclosure.

Figure 1:
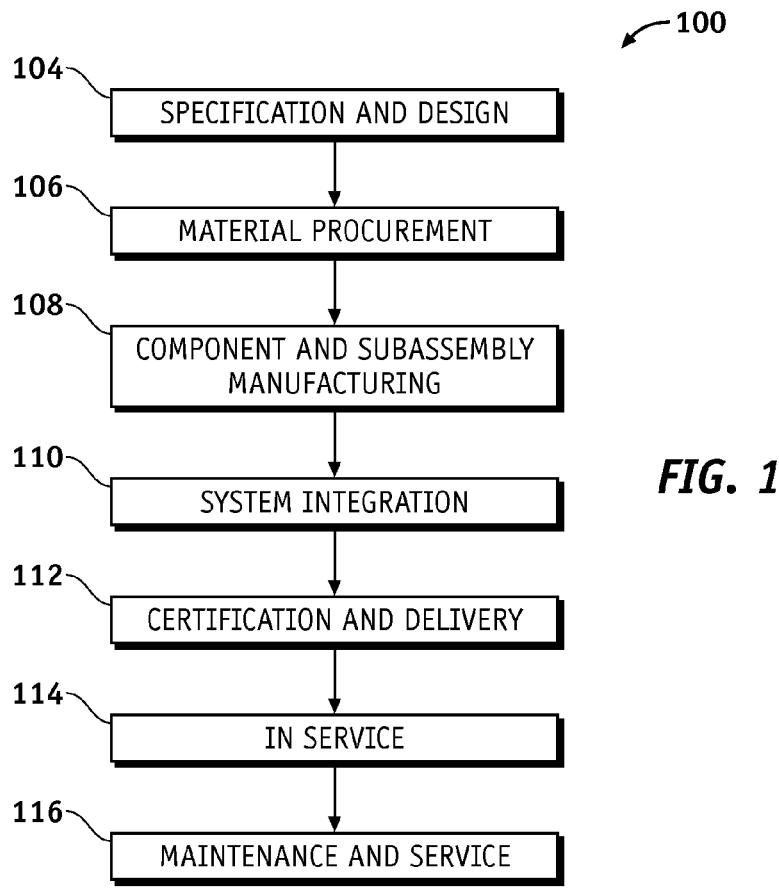
FIG. 1 is an illustration of a flow diagram of an exemplary aircraft production and service methodology.
Figure 2:
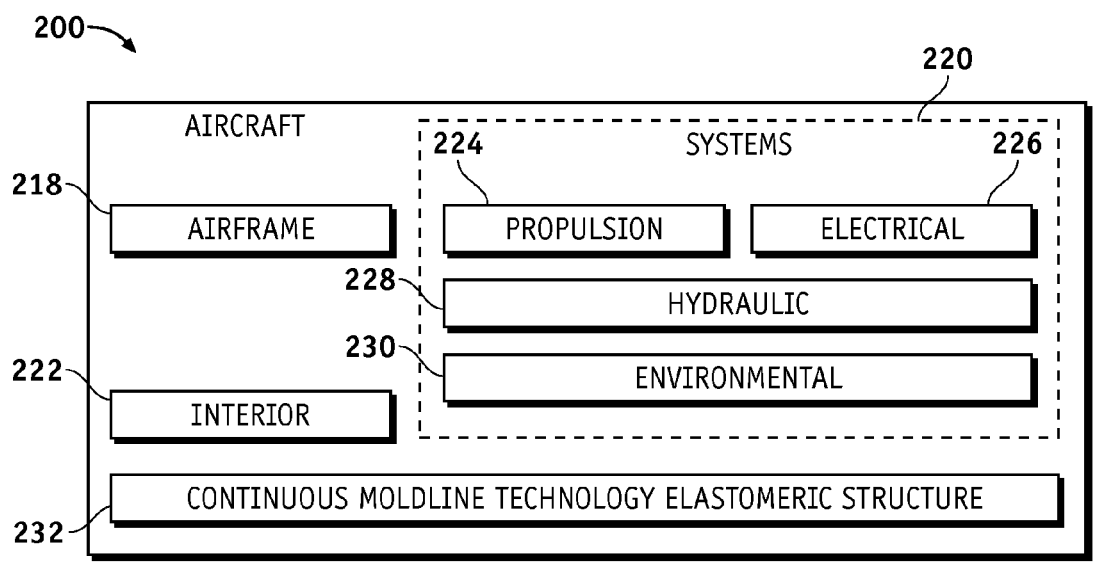
FIG. 2 is an illustration of an exemplary block diagram of an aircraft.

Referring more particularly to the drawings, embodiments of the disclosure may be described in the context of an aircraft manufacturing and service method 100 (method 100) as shown in FIG. 1 and an aircraft 200 as shown in FIG. 2. During pre-production, the exemplary method 100 may include specification and design 104 of the aircraft 200 and material procurement 106. During production, component and subassembly manufacturing 108 and system integration 110 of the aircraft 200 takes place. Thereafter, the aircraft 200 may go through certification and delivery 112 in order to be placed in service 114. While in service by a customer, the aircraft 200 is scheduled for routine maintenance and service 116 (which may also include modification, reconfiguration, refurbishment, and so on).

Each of the processes of method 100 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be without limitation an airline, leasing company, military entity, service organization, and the like.

As shown in FIG. 2, the aircraft 200 produced by the exemplary method 100 may include an airframe 218 with a plurality of systems 220, an interior 222, and a continuous moldline technology elastomeric structure 232. Examples of high-level systems 220 include one or more of a propulsion system 224, an electrical system 226, a hydraulic system 228, and an environmental system 230. Any number of other systems may also be included. Although an aerospace example is shown, the embodiments of the disclosure may be applied to other industries.

Apparatus and methods embodied herein may be employed during any one or more of the stages of the production and service method 100. For example, components or subassemblies corresponding to production process 108 may be fabricated or manufactured in a manner similar to components or subassemblies produced while the aircraft 200 is in service. In addition, one or more apparatus embodiments, method embodiments, or a combination thereof may be utilized during the production stages 108 and 110, for example, by substantially expediting assembly of or reducing the cost of an aircraft 200. Similarly, one or more of apparatus embodiments, method embodiments, or a combination thereof may be utilized while the aircraft 200 is in service, for example and without limitation, to maintenance and service 116.

When flight control surfaces move they typically create gaps, which in turn cause additional airframe acoustic noise, and reduced aerodynamics, or increased drag. Embodiments of the disclosure provide a continuous moldline technology (CMT) elastomeric interface structure for control surfaces (elastomer control surfaces) for mitigating such effects. The elastomer control surfaces subtly "quietly" control a movement of a vehicle such as an aircraft without exposing gaps, decreasing acoustics and achieving improved fluid dynamics. Elastomer control surfaces according to the embodiments provide a smaller actuated control surface such as a flight control surface surrounded by the elastomer that equates to a normally sized, by area, flight control surface thereby reducing weight and potentially power requirements.

Furthermore, by using the elastomeric control surfaces described herein, a direction of flight during an aircraft operation can change in pitch, yaw, or roll without exposing gaps or edges. In this manner, when an aircraft requires changes in direction, gains are achieved in reduced acoustics and improved aerodynamics by providing improvement in associated acoustic and aerodynamic drag reduction.

Figure 3:
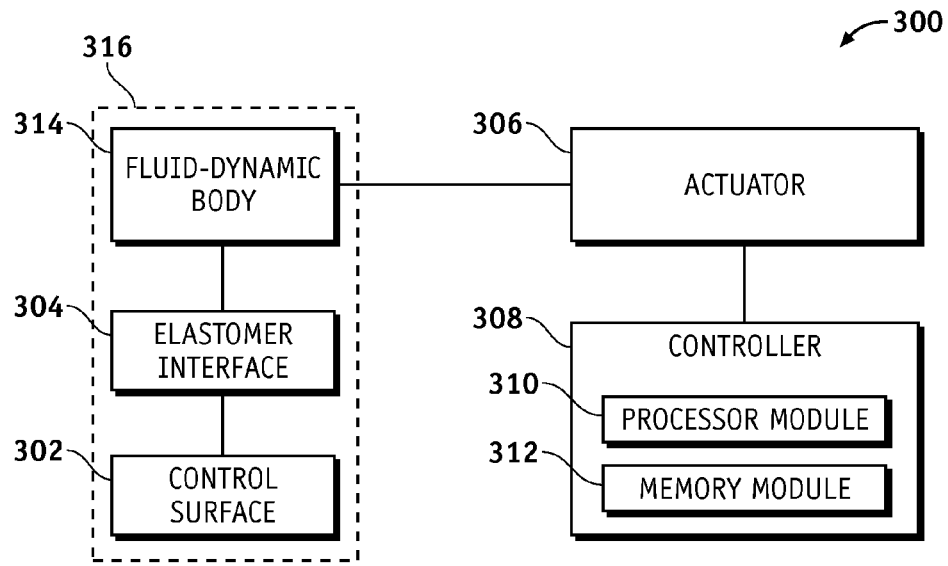
FIG. 3 is an illustration of an exemplary system for operating a CMT elastomeric structure according to an embodiment of the disclosure.

FIG. 3 is an illustration of an exemplary system 300 for operating a CMT elastomeric structure 316 according to an embodiment of the disclosure. The system 300 may comprise the CMT elastomeric structure 316, an actuator 306, and a controller 308.

The CMT elastomeric structure 316 comprises a control surface 302, a fluid-dynamic body 314, and an elastomer interface 304.

The control surface 302 is coupled to the fluid-dynamic body 314. The control surface 302 may comprise, for example but without limitation, a landing gear door (not shown), a flight control surface such as a slat, an aileron, a tail, a rudder, an elevator, a flap, a spoiler, a horizontal stabilizer or other control surface capable of moving through a fluid such as air, water, or other medium to alter a path, a route, or a movement of a vehicle or a structure.

The elastomer interface 304 is coupled to the control surface 302 and the fluid-dynamic body 314 such that a joint gap 410 (FIG. 4) caused by movement of the control surface 302 relative to the fluid-dynamic body 314 is filled. The elastomer interface 304 comprises an elastomeric material which is often used interchangeably with the term rubber, or rubber-like, and is preferred when referring to vulcanisates. Elastomer is elastic and has an ability to return to an original shape when a load is removed, and comprises many parts (e.g., polymer). Elastomers are amorphous polymers existing above their glass transition temperature, so that considerable segmental motion is possible. At ambient temperatures rubbers are thus relatively soft (e.g., E~3 MPa, where E is modulus of elasticity in megapascals (MPa or N/mm$^2$)) and deformable. Primary uses for rubbers are for seals, adhesives and molded flexible parts.

Elastomers are generally thermosets (requiring vulcanization) but may also be thermoplastic. The long polymer chains cross-link during curing and account for the flexible nature of the material. The molecular structure of elastomers can be imagined as a "spaghetti and meatball" structure, with the meatballs signifying cross-links. The elastomer interface 304 may comprise any elastomer known in the art such as, but without limitation, Natural Rubber, Polyisoprene, Butyl Rubber, Polybutadiene, Styrene Butadiene Rubber or SBR, Nitrile Rubber, also called buna N rubbers, Chloroprene Rubber, RTV Silicones, or other elastomer.

The fluid-dynamic body 314 may comprise, for example but without limitation, a fuselage, a wing, a canard, a horizontal stabilizer, or other fluid-dynamic body capable of moving through a fluid such as, without limitation, air, water, or other medium. The fluid-dynamic body 314 may be coupled to a vehicle or other structure. The vehicle may comprise, for example but without limitation, a manned and unmanned ground, air, space, water, underwater vehicle, or other vehicle.

The actuator 306 is configured to vary a shape (e.g., bend, deflect, extend, expand, change shape) of the control surface 302 in response to an actuation command from the controller 308. The actuation command may be generated by, without limitation, an input from a pilot/operator, a preprogrammed input from the processor module 310 of the controller 308 in case of an automated control, or a combination thereof. Any actuator known to those skilled in the art may be used for actuation of the control surface 302. For example but without limitation, a hydraulic actuator, a piezoelectric actuator, a spring loaded mechanism, a reverse flow blocking mechanism, a pyrotechnic actuator, a shape memory alloy actuator, or other actuator may be used.

The controller 308 may comprise, for example but without limitation, a processor module 310, a memory module 312, or other module. The controller 308 may be implemented as, for example but without limitation, a part of an aircraft system, a centralized aircraft processor, a subsystem computing module devoted to the control surface 302, or other implementation. The controller 308 is configured to control the actuator 306 to vary a shape and/or a position of the control surface 302 according to various operation conditions. The operation conditions may comprise, for example but without limitation, flight conditions, ground operations, or other condition. The flight conditions may comprise, for example but without limitation, take off, cruise, approach, landing, or other flight conditions. The ground operations may comprise, for example but without limitation, air breaking after landing, or other ground conditions. The controller 308, may be located remotely from the actuator 306, or may be coupled to the actuator 306.

The processor module 310 comprises processing logic that is configured to carry out the functions, techniques, and processing tasks associated with the operation of the system 300. In particular, the processing logic is configured to support the system 300 described herein. For example, the processor module 310 may direct the actuator 306 to vary a position of the control surface 302 based on various flight conditions.

The processor module 310 may be implemented, or realized, with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. In this manner, a processor may be realized as a microprocessor, a controller, a microcontroller, a state machine, or the like. A processor may also be implemented as a combination of computing devices, e.g., a combination of a digital signal processor and a microprocessor, a plurality of microprocessors, one or more microprocessors in conjunction with a digital signal processor core, or any other such configuration.

The memory module 312 may comprise a data storage area with memory formatted to support the operation of the system 300. The memory module 312 is configured to store, maintain, and provide data as needed to support the functionality of the system 300. For example, the memory module 312 may store flight configuration data, or other data.

In some embodiments, the memory module 312 may comprise, for example but without limitation, a non-volatile storage device (non-volatile semiconductor memory, hard disk device, optical disk device, and the like), a random access storage device (for example, SRAM, DRAM), or any other form of storage medium known in the art.

The memory module 312 may be coupled to the processor module 310 and configured to store, for example but without limitation, a database, a computer program that is executed by the processor module 310, an operating system, an application program, tentative data used in executing a program, and other application. Additionally, the memory module 312 may represent a dynamically updating database containing a table for updating the database, and the like.

The memory module 312 may be coupled to the processor module 310 such that the processor module 310 can read information from and write information to the memory module 312. For example, the processor module 310 may access the memory module 312 to access an aircraft speed, a flight control surface position, an angle of attack, a Mach number, an altitude, or other data.

As an example, the processor module 310 and memory module 312 may reside in respective application specific integrated circuits (ASICs). The memory module 312 may also be integrated into the processor module 310. In an embodiment, the memory module 312 may comprise a cache memory for storing temporary variables or other intermediate information during execution of instructions to be executed by the processor module 310.

Figure 4:
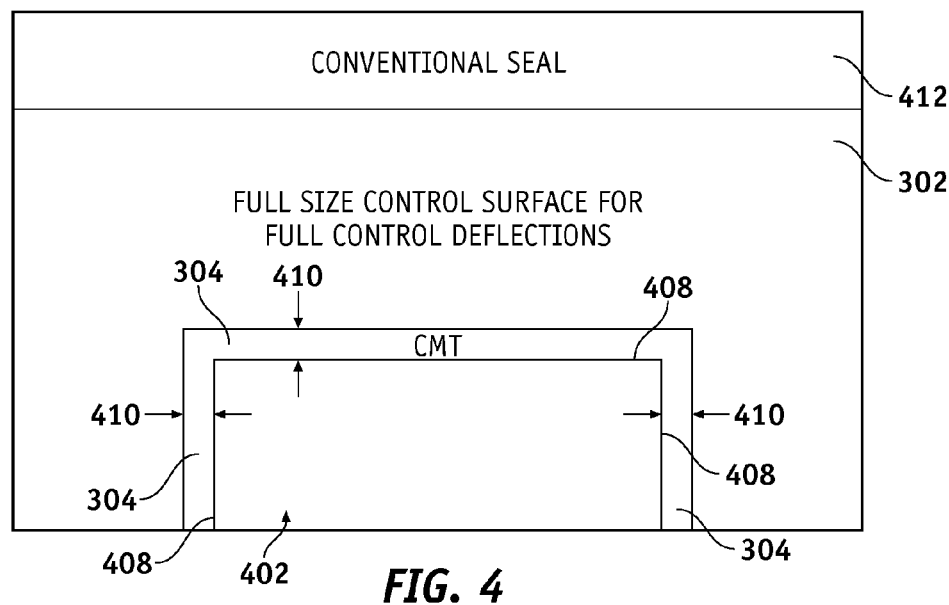
FIG. 4 is an illustration of an exemplary schematic top view of a CMT elastomeric structure showing a small CMT control surface built into a full size control surface according to an embodiment of the disclosure.

FIG. 4 is an illustration of an exemplary schematic top view of a CMT elastomeric structure 400 showing a small CMT "Quiet" control surface 402 built into a (full size) control surface such as the control surface 302 according to an embodiment of the disclosure. The CMT elastomeric structure 400 comprises the CMT "Quiet" control surface 402 embedded in the control surface 302 with the elastomer interface 304. The control surface 302 is a full size control surface configured for full control deflections and may be coupled to the fluid-dynamic body 314. The control surface 302 may comprise a conventional seal 412. In the embodiment shown in FIG. 4, the elastomer interface 304 comprises a reinforced elastomer CMT panel coupled on three sides 408 of the CMT "Quiet" control surface 402 filling the joint gaps 410. The CMT "quiet" control surface 402 comprises an actuatable movable surface which when actuated and used in a "quite mode" can move, for example but without limitation, about 2 degrees, about 3 degrees, or other suitable range. Elastomer interface and elastomeric interface may be used interchangeably in this document.

Figure 5:
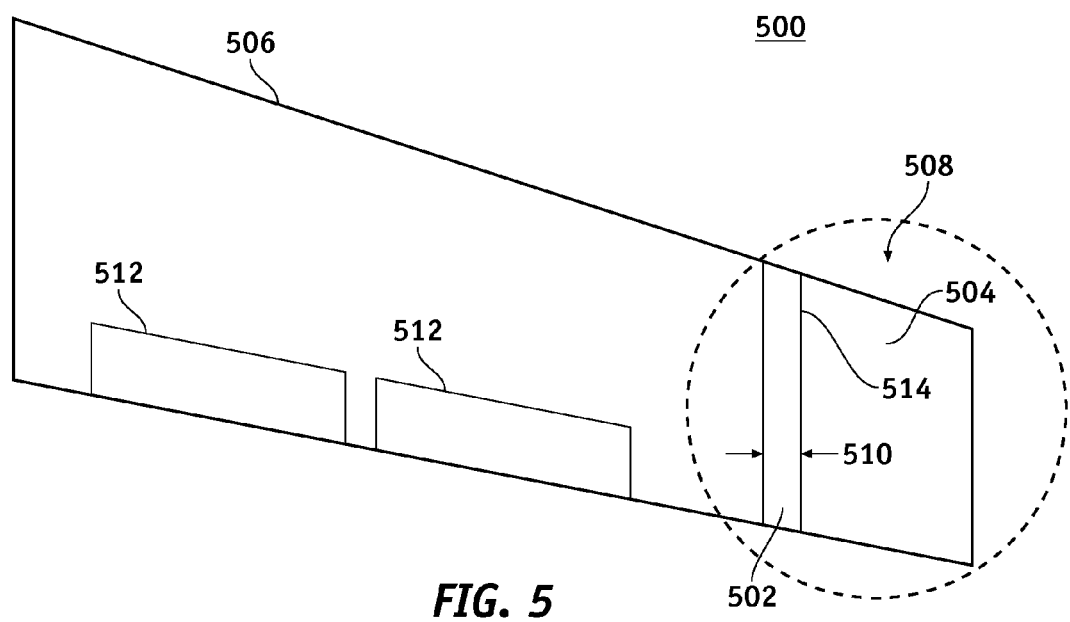
FIG. 5 is an illustration of an exemplary schematic top view of a CMT elastomeric structure showing a CMT wing tip for roll control according to an embodiment of the disclosure.

FIG. 5 is an illustration of an exemplary schematic top view of a CMT elastomeric structure 500 showing a CMT "Quiet" wing tip 508 (CMT wing tip 508) for roll control according to an embodiment of the disclosure. An elastomeric interface 502 comprising a CMT seal is coupled to a (movable) wing tip 504 of a fixed wing 506 for roll control. The elastomeric interface 502 provides a link 514 between the wing tip 504 and the fixed wing 506 creating the CMT wing tip 508 for roll control. The CMT elastomeric structure 500 may also comprise other control surfaces 512.

The CMT wing tip 508 used for roll control wherein the wing tip 504 pivots much like a stabilizer or a stabilator on some aircraft. Therefore, the CMT wing tip 508 may act as a horizontal stabilizer or a stabilator for an outer wing control surface of the fixed wing 506. The elastomeric interface 502 between the fixed wing 506 and the movable wing tip 504 comprises a reinforced elastomer panel that allows for roll control without exposing any gaps such as a joint gap 510. The CMT wing tip 508 may be sized to induce a roll.

Figure 6:
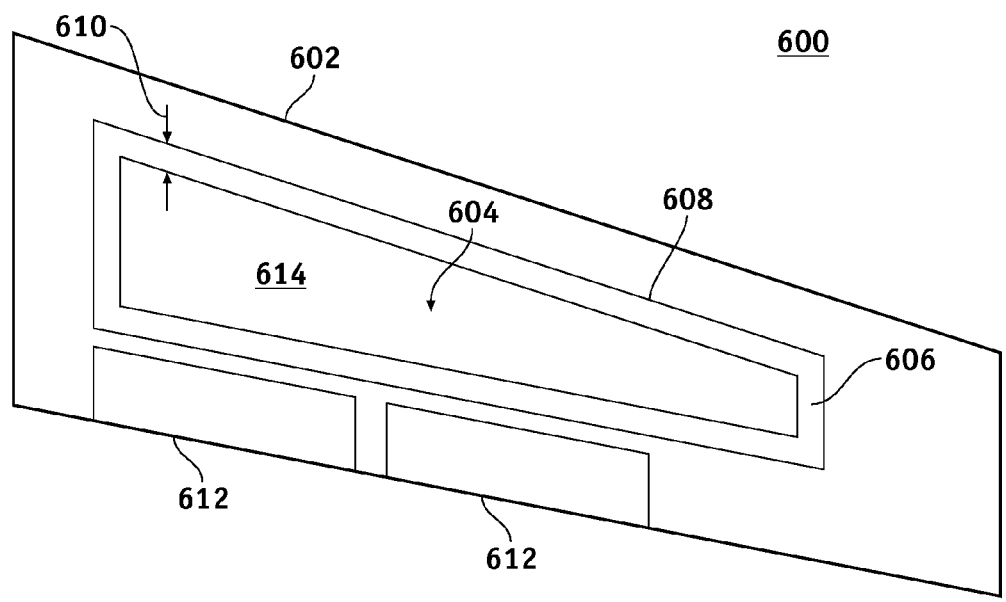
FIG. 6 is an illustration of an exemplary schematic top view of a CMT elastomeric structure showing a CMT extendable and/or expandable blister surface section used to increase lift on a wing for roll control according to an embodiment of the disclosure.

FIG. 6 is an illustration of an exemplary schematic top view of a CMT elastomeric structure 600 showing a lifting surface 604 comprising a CMT "Quiet" extendable and/or expandable blister surface section 614 (blister surface section 614) used to increase lift on a wing 602 for roll control according to an embodiment of the disclosure. The lifting surface 604 alters a thickness of the wing 602 at the lifting surface 604 by an extending and/or expanding motion of the blister surface section 614 to alter a lift and induce roll on an inflight aircraft. The CMT elastomeric structure 600 may also comprise other control surfaces 612.

The lifting surface 604 comprises a piece of structure such as the blister surface section 614 that can be embedded in an upper or lower surface of the wing 602 and is capable of being extended and/or expanded outside a normal mold line of the wing 602 to increase a thickness of the wing 602 and thus cause greater lift on the wing 602 inducing a rolling moment. A lifting surface such as the blister surface section 614 is attached on all sides of the lifting surface 604 by an elastomer interface 606 reinforced around a perimeter 608 of the lifting surface 604. In this manner, an area of the lifting surface 604 increases without exposing any joint gaps 610 on the wing 602. The lifting surface 604 should be sized to induce a roll.

In operation, the lifting surface 604 conforms to a contour of the wing 602 in a first control surface position, and alters a thickness of the wing 602 in a second control surface position to alter a lift of the wing 602 and induces a roll in an inflight aircraft. The second control surface position may comprise a position from a substantially large number of positions.

Figure 7:
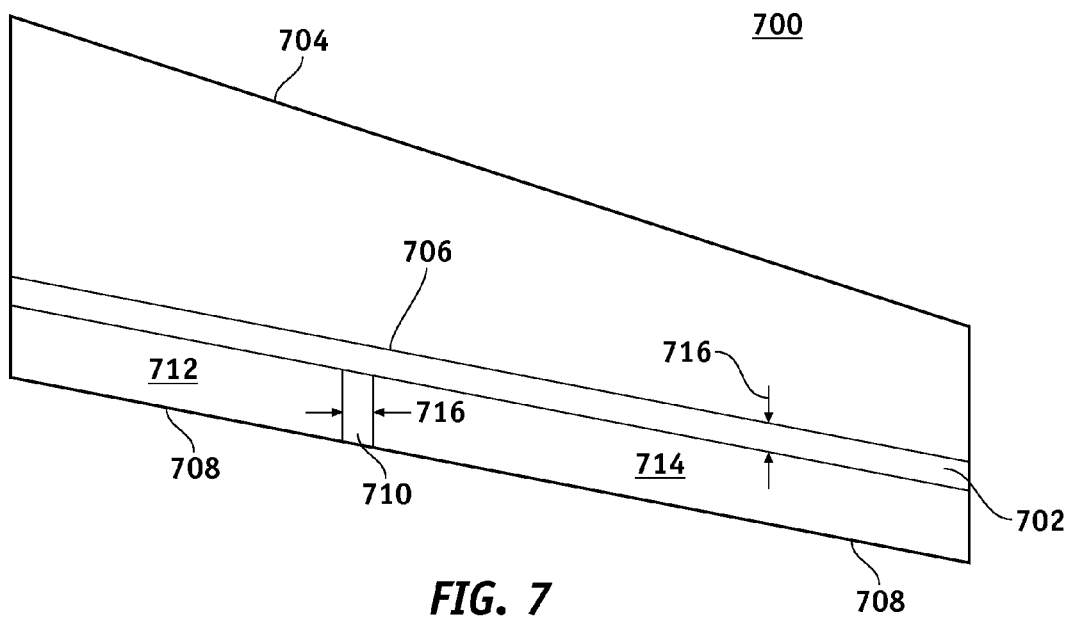
FIG. 7 is an illustration of an exemplary schematic top view of a CMT elastomeric structure showing a CMT translating trailing edge section on a wing used to increase lift and associated roll control according to an embodiment of the disclosure.

FIG. 7 is an illustration of an exemplary schematic top view of a CMT elastomeric structure 700 showing a CMT "Quiet" translating trailing edge section 706 on a wing 704 to increase lift and associated roll control according to an embodiment of the disclosure.

In one embodiment, the CMT elastomeric structure 700 comprises the CMT "Quiet" translating trailing edge section 706 (CMT translating trailing edge 706) coupled to the wing 704 with the elastomeric interface 702 that can move aft to increase an area of the wing 704 on a side, thereby causing extra lift and associated roll. The elastomeric interface 702 may be reinforced on a top and/or on a bottom of the wing 704.

In another embodiment, the CMT translating trailing edge 706 may comprise a full-span combination flap and aileron 708 comprising a flap 712, and an aileron 714 joined to the wing 704 by an externally reinforced elastomer panel such as the elastomeric interface 702. In this manner, a section of the wing 704 can be extended aft increasing a total area of the wing 704, and therefore increasing lift on the wing 704 inducing a rolling moment, and such that a joint gap 716 caused by movement of the CMT translating trailing edge 706 relative to the wing 704 is filled.

In another embodiment, the full-span combination flap and aileron 708 can be segmented over a span of the wing 704 by an elastomer panel such as the elastomeric interface 710 (e.g., as an embodiment of a second elastomer interface) reinforced between the flap 712 (e.g., as an embodiment of a first control surface) and the aileron 714 (e.g., as an embodiment of a second control surface) to provide bending capability. The flap 712 and the aileron 714 are coupled to the wing 704 (e.g., as an embodiment of a fluid-dynamic body) by the elastomeric interface 702. The elastomeric interface 710 (second elastomer interface) is coupled to the flap 712 (first control surface) and the aileron 714 (second control surface) such that the joint gap 716 (e.g., as an embodiment of a second joint gap) caused by movement of the flap 712 (first control surface) relative to the aileron 714 (second control surface) is filled.

The illustrated embodiments are each but one example, and those skilled in the art will appreciate that multiple leading and trailing edge configurations can be used, and that multiple configurations of the corresponding surfaces and elastomeric interfaces therefore can be used. Moreover, as mentioned above, the embodiments are not limited to aircraft structures and may also be applicable to, for example but without limitation, any manned and unmanned ground, air, water and underwater vehicles.

Figure 8:
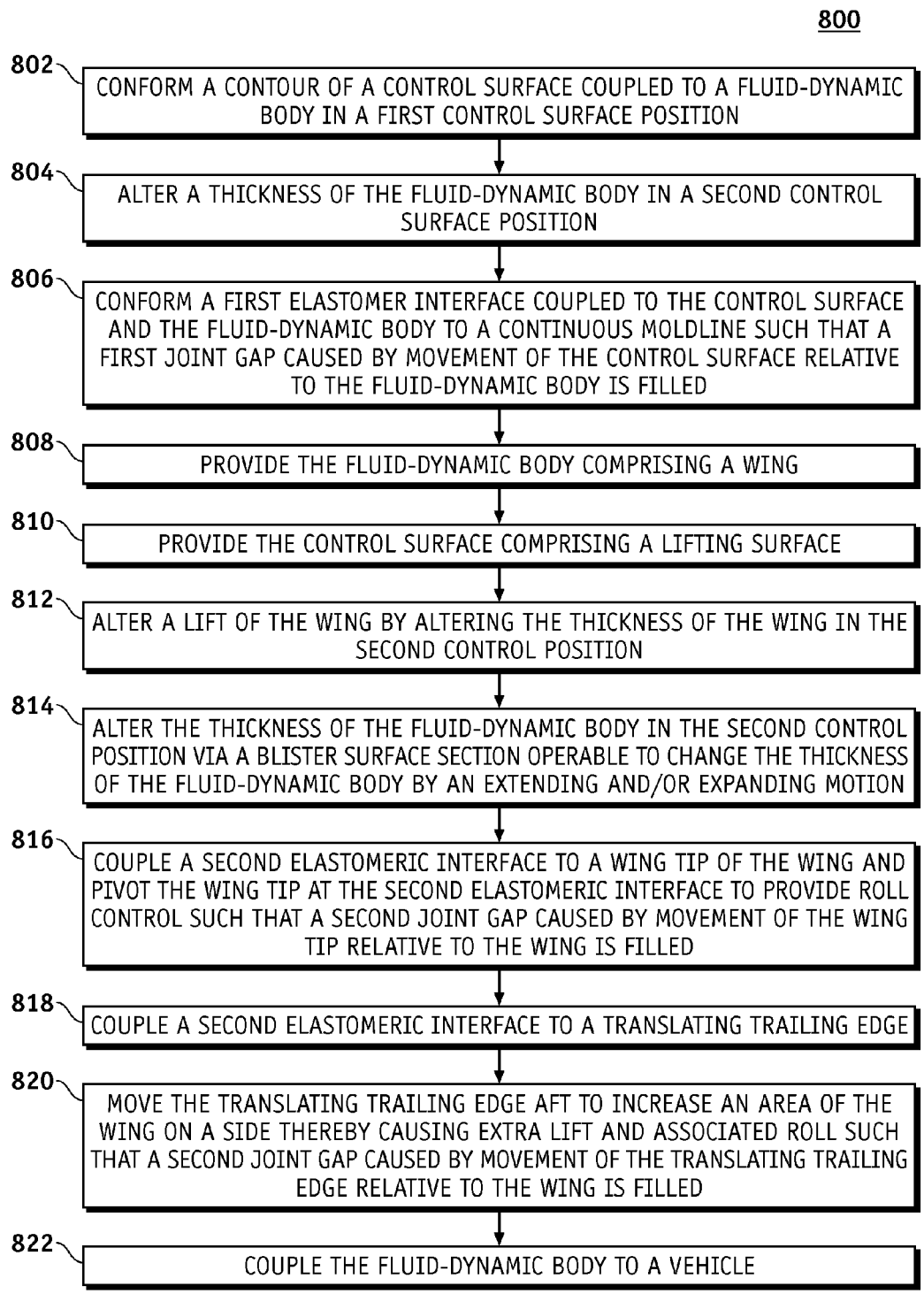
FIG. 8 is an illustration of an exemplary flowchart showing a process for controlling a CMT elastomeric structure according to an embodiment of the disclosure.

FIG. 8 is an illustration of an exemplary flowchart showing a process 800 for controlling a fluid-dynamic body using a CMT elastomeric control surface according to an embodiment of the disclosure. The various tasks performed in connection with process 800 may be performed mechanically, by software, hardware, firmware, a computer-readable medium having computer executable instructions for performing the process method, or any combination thereof. It should be appreciated that process 800 may include any number of additional or alternative tasks, the tasks shown in FIG. 8 need not be performed in the illustrated order, and process 800 may be incorporated into a more comprehensive procedure or process having additional functionality not described in detail herein.

For illustrative purposes, the following description of process 800 may refer to elements mentioned above in connection with FIGS. 3-7. In some embodiments, portions of the process 800 may be performed by different elements of the system 300 such as: the CMT elastomeric structure 316, the actuator 306, the controller 308, etc. Process 800 may have functions and structures similar to embodiments in FIGS. 3-7. Therefore common features, functions, and elements may not be redundantly described here.

Process 800 may begin by conforming a contour of a control surface such as the lifting surface 604 coupled to a fluid-dynamic body such as the wing 602 in a first control surface position (task 802).

Process 800 may continue by altering a thickness of the fluid-dynamic body in a second control surface position (task 804).

Process 800 may continue by conforming a first elastomer interface such as the elastomer interface 606 coupled to the control surface and the fluid-dynamic body to a continuous moldline such that a first joint gap such as the joint gap 610 caused by movement of the control surface relative to the fluid-dynamic body is filled (task 806).

Process 800 may continue by providing the fluid-dynamic body comprising a wing such as the wing 506/602 (task 808).

Process 800 may continue by providing the control surface 302 comprising the lifting surface 604 (task 810). As discussed above, in some embodiments the control surface 302 comprises the wing tip 504 operable to pivot at the elastomeric interface 502 to provide roll control such that the joint gap 510 caused by movement of the wing tip 504 relative to the wing 506 is filled. Also as discussed above, in some embodiments the control surface comprises a translating trailing edge such as the CMT translating trailing edge 706 operable to move aft to increase an area of the wing 704 on a side thereby causing extra lift and associated roll such that the joint gap 716 caused by movement of the translating trailing edge 706 relative to the wing 704 is filled.

Process 800 may continue by altering a lift of the wing 602 by altering the thickness of the wing 602 in the second control position (task 812).

Process 800 may continue by altering the thickness of the wing 602 (e.g., thereby altering the lift of the wing 602) in the second control position via a blister surface section such as the blister section 614 operable to change the thickness of the fluid-dynamic body by an extending and/or expanding motion (task 814).

Process 800 may continue by coupling a second elastomeric interface such as the elastomeric interface 502 to a wing tip such as the wing tip 504 (as an embodiment of the control surface 302) of the wing 506 and pivoting the wing tip 504 at the second elastomeric interface to provide roll control such that a second joint gap such as the joint gap 510 caused by movement of the wing tip 504 relative to the wing 506 is filled (task 816).

Process 800 may continue by coupling a second elastomeric interface such as the elastomeric interface 702 to a translating trailing edge such as the CMT translating trailing edge 706 (as an embodiment of the control surface 302) (task 818).

Process 800 may continue by moving the translating trailing edge aft to increase an area of the wing 704 on a side thereby causing extra lift and associated roll such that a second joint gap such as the joint gap 716 caused by movement of the translating trailing edge relative to the wing 704 is filled (task 820).

Process 800 may continue by coupling the fluid-dynamic body to a vehicle such as the aircraft 200 (task 822).

Figure 9:
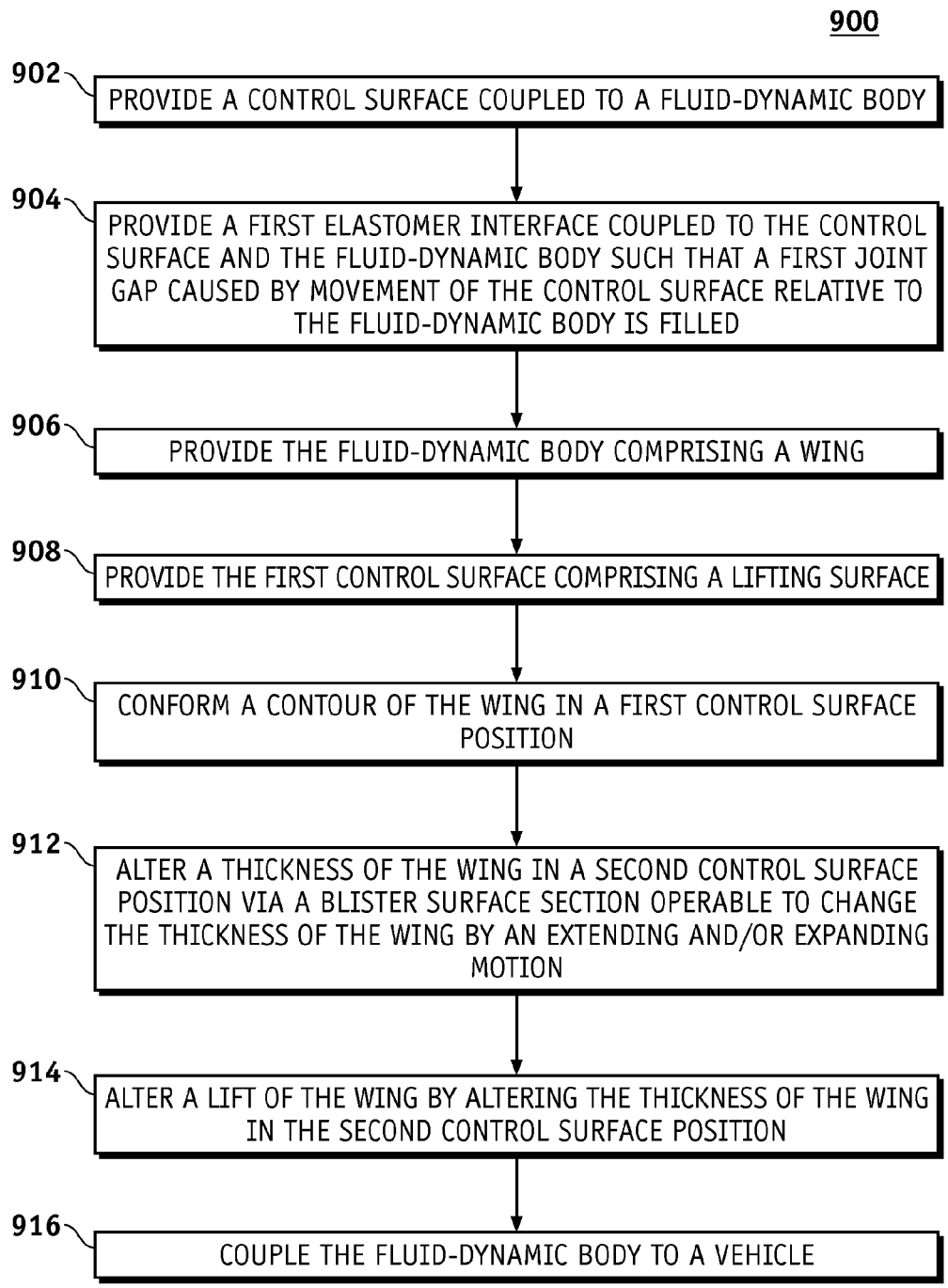
FIG. 9 is an illustration of an exemplary flowchart showing a process for providing a CMT elastomeric structure according to an embodiment of the disclosure.

FIG. 9 is an illustration of an exemplary flowchart showing a process 900 for providing a CMT elastomeric structure according to an embodiment of the disclosure. The various tasks performed in connection with process 900 may be performed mechanically, by software, hardware, firmware, a computer-readable medium having computer executable instructions for performing the process method, or any combination thereof. It should be appreciated that process 900 may include any number of additional or alternative tasks, the tasks shown in FIG. 9 need not be performed in the illustrated order, and process 900 may be incorporated into a more comprehensive procedure or process having additional functionality not described in detail herein.

For illustrative purposes, the following description of process 900 may refer to elements mentioned above in connection with FIGS. 3-7. In some embodiments, portions of the process 900 may be performed by different elements of the system 300 such as: the CMT elastomeric structure 316, the actuator 306, the controller 308, etc. Process 900 may have functions and structures similar to embodiments in FIGS. 3-7. Therefore common features, functions, and elements may not be redundantly described here.

Process 900 may begin by providing a control surface such as the control surface 302 coupled to a fluid-dynamic body such as the fluid-dynamic body 314 (task 902).

Process 900 may continue by providing a first elastomer interface such as the elastomer interface 304 coupled to the control surface 302 and the fluid-dynamic body 314 such that a joint gap such as the joint gap 410 caused by movement of the control surface 302 relative to the fluid-dynamic body is filled (task 904).

Process 900 may continue by providing the fluid-dynamic body 314 comprising a wing such as the wing 602 (task 906).

Process 900 may continue by providing the control surface 302 comprising a lifting surface such as the lifting surface 604 (task 908).

Process 900 may continue by conforming a contour of the wing 602 in a first control surface position (task 910).

Process 900 may continue by altering a thickness of the wing 602 in a second control surface position via a blister surface section such as the a blister surface section 614 operable to change the thickness of the wing 602 by an extending and/or expanding motion (task 912).

Process 900 may continue by altering a lift of the wing 602 by altering the thickness of the wing 602 in the second control surface position (task 914).

Process 900 may continue by coupling the fluid-dynamic body 314 to a vehicle such as the aircraft 200 (task 916).

In this manner, the movement of a vehicle such as an aircraft is subtly/quietly controlled without exposing gaps, decreasing acoustics noise and achieving improved aerodynamics. Exposing no gaps or edges can decrease acoustic noise and increase aerodynamics efficiency or decrease drag. For example, during approach to landing, gaps are bridged, which reduces noise during movement of flight control surfaces for pitch and roll to change direction of flight. Furthermore, a flight control surface surrounded by the elastomer may be smaller than a flight control surface not surrounded by the elastomer, while preforming substantially equivalently to the flight control surface not surrounded by the elastomer.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 3-7 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. A continuous moldline technology elastomeric control surface, comprising:
a first control surface coupled to a fluid-dynamic body; and
a first elastomer interface comprising a continuous elastomer surface directly coupled to the first control surface and the fluid-dynamic body such that a first joint gap caused by movement of the first control surface relative to the fluid-dynamic body is filled, the continuous elastomer surface continuous from the fluid-dynamic body to the first control surface, wherein:
the fluid-dynamic body comprises a wing, and
the first control surface comprises a translating trailing edge operable to move aft to increase an area of the wing on a side thereby causing extra lift and associated roll.

2. The continuous moldline technology elastomeric control surface of claim 1, wherein the fluid-dynamic body is coupled to a vehicle.

3. The continuous moldline technology elastomeric control surface of claim 2, wherein the vehicle comprises an aircraft.

4. The continuous moldline technology elastomeric control surface of claim 1, further comprising:
a second control surface coupled to the fluid-dynamic body; and
a second elastomer interface comprising a second continuous elastomer surface directly coupled to the first control surface and the second control surface such that a second joint gap caused by movement of the first control surface relative to the second control surface is filled, the second continuous elastomer surface continuous from the fluid-dynamic body to the second control surface.

5. The continuous moldline technology elastomeric control surface of claim 1, wherein:
the first control surface comprises a lifting surface operable to:
conform to a contour of the wing in a first control surface position; and
alter a thickness of the wing in a second control surface position to alter a lift of the wing.

6. The continuous moldline technology elastomeric control surface of claim 5, wherein the lifting surface comprises a blister surface section operable to alter the thickness of the wing by at least one motion selected from the group consisting of: extending the blister surface section, and expanding the blister surface section.

7. The continuous moldline technology elastomeric control surface of claim 6, wherein the thickness of the wing in the second position induces a roll in an inflight aircraft.

8. The continuous moldline technology elastomeric control surface of claim 1, wherein:
the first control surface comprises a wing tip operable to pivot at the first elastomer interface to provide roll control, the first elastomer interface located on an outer surface of the wing and extending from a leading edge to a trailing edge thereof to provide a link between the wing tip and the wing.

9. A method for providing a continuous moldline technology elastomeric control surface, the method comprising:
providing a control surface coupled to a fluid-dynamic body; and
providing an elastomer interface comprising a continuous elastomer surface directly coupled to the control surface and the fluid-dynamic body such that a joint gap caused by movement of the control surface relative to the fluid-dynamic body is filled, the continuous elastomer surface continuous from the fluid-dynamic body to the control surface, wherein:
the fluid-dynamic body comprises a wing, and
the control surface comprises a translating trailing edge operable to move aft to increase an area of the wing on a side thereby causing extra lift and associated roll such that the joint gap caused by movement of the translating trailing edge relative to the wing is filled.

10. The method of claim 9, further comprising:
providing the fluid-dynamic body comprising the wing; and
providing the control surface comprising a lifting surface.

11. The method of claim 10, further comprising:
conforming a contour of the wing in a first control surface position; and
altering a thickness of the wing in a second control surface position via a blister surface section operable to change the thickness of the wing by at least one motion selected from the group consisting of: extending the blister surface section, and expanding the blister surface section.

12. The method of claim 11, further comprising altering a lift of the wing by altering the thickness of the wing in the second control surface position.

13. The method of claim 9, further comprising coupling the fluid-dynamic body to a vehicle.

14. The method of claim 9, wherein:
the control surface comprises a wing tip operable to pivot at the elastomer interface to provide roll control such that the joint gap caused by movement of the wing tip relative to the wing is filled, the elastomer interface located on an outer surface of the wing and extending from leading edge to trailing edge thereof to provide a link between the wing tip and the wing.

15. A continuous moldline technology elastomeric control surface, comprising:
a first control surface coupled to a fluid-dynamic body comprising a wing; and
a first elastomer interface coupled to the first control surface and the fluid-dynamic body such that a first joint gap caused by movement of the first control surface relative to the fluid-dynamic body is filled, the first control surface comprising a translating trailing edge operable to move aft to increase an area of the wing on a side thereby causing extra lift and associated roll.

* * * * *